US012719699B2

(12) United States Patent
Yin et al.

(10) Patent No.: US 12,719,699 B2
(45) Date of Patent: Aug. 25, 2026

(54) METHOD AND APPARATUS FOR AUTHENTICATING IOT DEVICES

(71) Applicant: ARRIS Enterprises LLC, Horsham, PA (US)

(72) Inventors: Yiqun Yin, Riverside, CT (US); Xin Qiu, San Diego, CA (US); Oscar Jiang, West Covina, CA (US); Jason Pasion, San Diego, CA (US); Nicol C.P. So, Newtown, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 26 days.

(21) Appl. No.: 18/626,105

(22) Filed: Apr. 3, 2024

(65) Prior Publication Data

US 2024/0422015 A1 Dec. 19, 2024

Related U.S. Application Data

(60) Provisional application No. 63/521,533, filed on Jun. 16, 2023.

(51) Int. Cl.
*H04L 9/32* (2006.01)

(52) U.S. Cl.
CPC .......... *H04L 9/3263* (2013.01); *H04L 9/3268* (2013.01)

(58) Field of Classification Search
CPC ...................................................... H04L 9/3263
See application file for complete search history.

(56) References Cited

U.S. PATENT DOCUMENTS

2016/0373418 A1* 12/2016 Ståhl ........................ G06F 21/44
2018/0184290 A1* 6/2018 Luo ..................... H04L 63/0442
2019/0238342 A1 8/2019 Lian et al.
2020/0304318 A1* 9/2020 Kravitz ................. H04L 9/3268
2021/0044972 A1 2/2021 Murray
2022/0417038 A1* 12/2022 Kravitz ................... H04L 63/10

OTHER PUBLICATIONS

International Search Report and Written Opinion RE: Application No. PCT/US24/22883, dated Jul. 22, 2024.
Jones, M., et al., "JSON Web Token (JWT)", Internet Engineering Task Force (IETF), May 2015, 7519, Category: Standards Track, ISSN: 2070-1721, pp. 1-30.
Diehl, E., "Securing Digital Video: Techniques for DRM and Content Protection", Springer, 2012, p. 123.

* cited by examiner

*Primary Examiner* — Bradley W Holder
(74) *Attorney, Agent, or Firm* — Chernoff, Vilhauer, McClung & Stenzel, LLP

(57) ABSTRACT

A system and method for authenticating a device is disclosed. In one embodiment, the method comprises generating an anti-tampering secret (ATS) associated with customer specific information (CSI); providing the ATS for secure storage by the device; receiving a message from the device, the certificate signing request comprising a certificate signing request, the CSI, and an authentication tag derived at least in part according to the ATS and the CSI; and authenticating the received message according to a comparison of the received authentication tag and a another authentication tag generated at least in part according to the received CSI.

14 Claims, 5 Drawing Sheets

METHOD AND APPARATUS FOR AUTHENTICATING IOT DEVICES

CROSS REFERENCE TO RELATED APPLICATIONS

The present application claims priority to U.S. Provisional App. No. 63/521,533 filed Jun. 16, 2023, the contents of which are incorporated herein by reference in their entirety.

BACKGROUND

1. Field

The present disclosure relates to systems and methods for providing security to remote devices and in particular to a system and method for authenticating remote.

2. Description of the Related Art

With the proliferation of Internet of Things (IoT) devices, there has been an ongoing industry-wide effort for an interoperable smart home protocol that enables seamless connectivity and secure communication between smart devices. CSA (Connectivity Standards Alliance) Matter is the evolving standard from this effort, and it requires that each Matter IoT device possess a unique public key infrastructure (PKI) key pair. Now IoT manufacturers face significant challenges in securely generating, installing, and preventing unauthorized copying of such Matter PKI keys, especially in a volume production environment. In the meantime, it also presents business opportunities for companies in the PKI space to enter the IoT market. By leveraging their extensive experience, PKI companies can provide both certificate authority (CA) services and certificate provisioning services to IoT manufacturers.

For certificate provisioning services, a PKI company may choose to deliver its client source code to potential IoT manufacturer/customer. This will facilitate the manufacturer integrating the code with their own code and testing the code on the customer's IoT devices. By running the integrated code, IoT devices will be able to take advantage of PKI company's provisioning service, such as requesting digital certificates from the PKI server.

There are two major challenges for adapting the existing provisioning protocols to the IoT space. First, many IoT devices do not possess necessary credentials (e.g., digital certificates) to attest to the identity of the manufacturer or the device itself. The lack of such credentials makes it difficult to authenticate messages from the device, which is an important step of the existing protocol flow. Second, manufacturing errors often occur during the device production process, and this may result in unauthorized use of the provisioning services.

SUMMARY

To address the requirements described above, this document discloses a system and method for authenticating a device. In one embodiment, the method comprises generating an anti-tampering secret (ATS) associated with customer specific information (CSI); providing the ATS for secure storage by the device; receiving a message from the device, the message from the device comprising a certificate signing request, the CSI, and an authentication tag derived at least in part according to the ATS and the CSI; and authenticating the received message according to a comparison of the received authentication tag and a another authentication tag generated at least in part according to the received CSI.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Figure 1A:
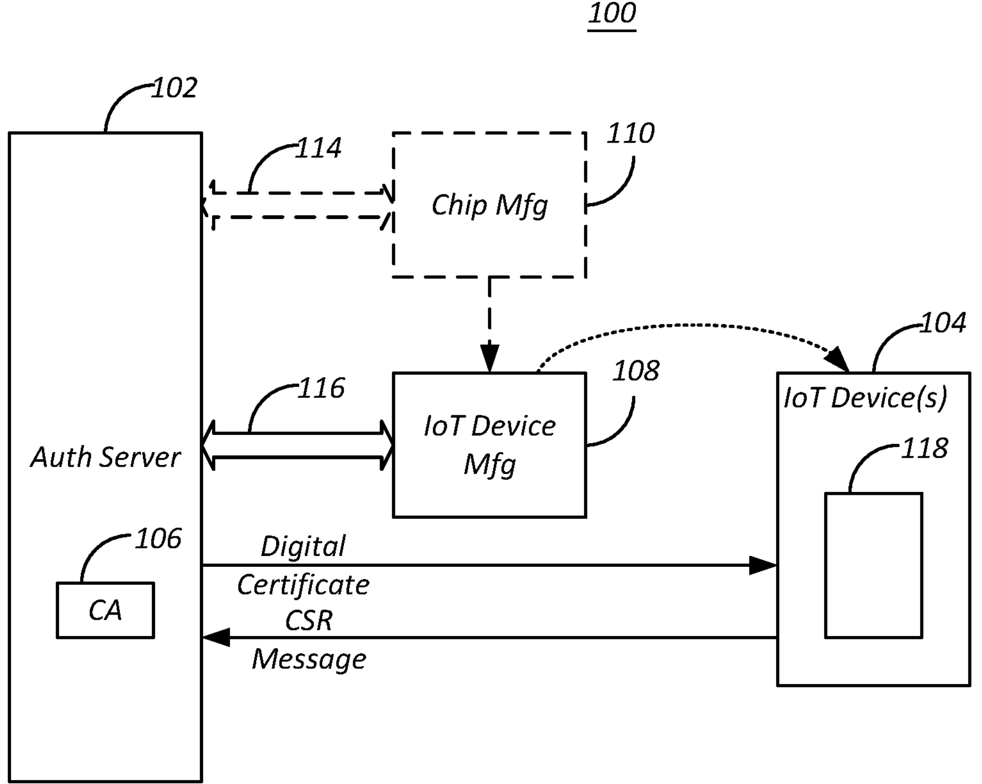
FIGS. 1A and 1B are diagrams depicting generalized systems for authenticating remote devices.
Figure 1B:
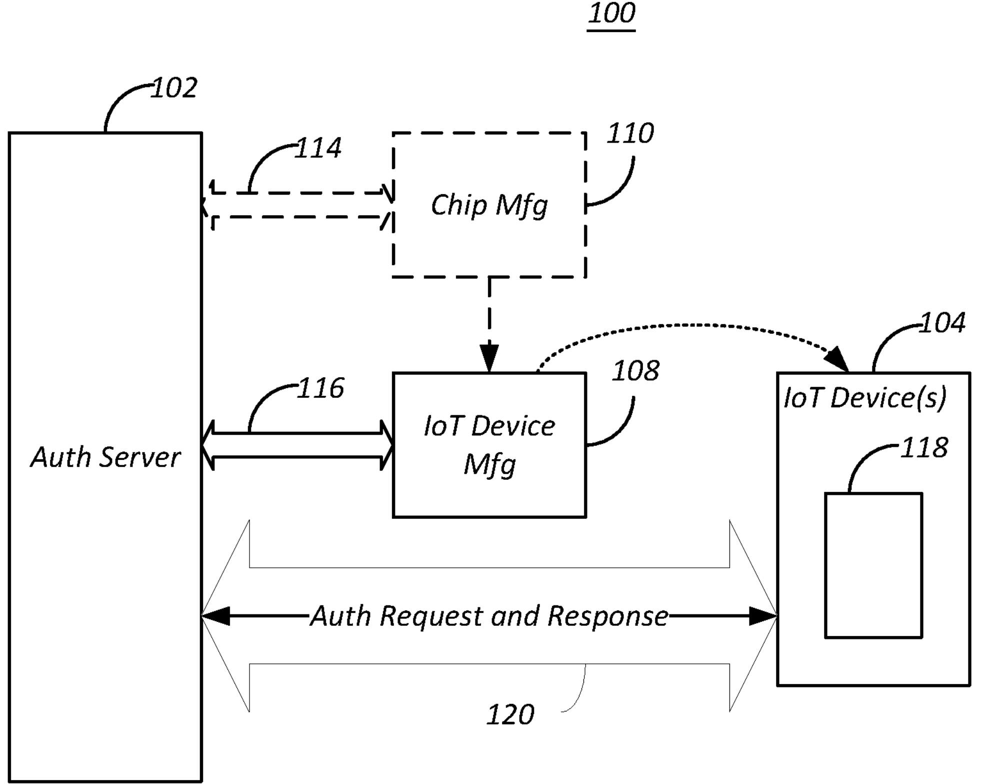

FIGS. 1A and 1B are diagrams depicting a generalized system 100 for authenticating IoT devices 104. FIG. 1A an embodiment in which the message exchange between an IoT device 104 and authentication server 102/CA 106 is a certificate signing request (CSR) and digital certificate. FIG. 1B depicts a more general embodiment in which the message exchange is some "authentication request and response," and the communication channel 120 may be further encrypted. The encryption mechanism depends on specific application scenarios. For example, it may be a TLS channel between the auth server and a programming station that is directly connected to the device. Or the encryption mechanism and encryption keys may be pre-established out of band prior to the communication. In both cases, the system 100 comprises a authentication server 102 such as a PM server. The authentication server is communicatively coupled to an IoT device manufacturer 108 via a secure communication channel 116. This communication channel is used to share secrets in temporal advance of the execution of the authentication protocol. For example, once the ATS is generated, it may be encrypted with a PGP (Pretty Good Privacy) key of the IoT manufacturer 108, and signed by the PGP of the authentication server 102.

IoT devices may comprise a secure chip 118 that makes it sufficiently difficult for an attacker to copy sensitive information such as the ATS from a legitimate IoT device 104 to other IoT devices 104. In such implementations, the ATS and other sensitive information can be delivered to the chip manufacturer 110, also via a secure communication channel 114. The secure chip 118, which stores the ATS 120 is then installed in the IoT device 108. Other means may be employed to protect that ATS and other private information stored in the IoT device 104, including for example, implementing a trusted execution environment (TEE) in the IoT device 104.

When a deployed IoT device 104 is to establish communication with an entity, that entity needs to confirm that the IoT device 104 is indeed the IoT device 104 it claims to be, and not a cloned IoT device. In PKI class systems, this may be accomplished by generating a digital certificate signing request (CSR) to a certificate authority (CA) 106. The CSR includes the public key of a public/private key pair unique to the device 104. The CA 106 authenticates the device using the public key, and if the device is authenticated, provides a digital certificate to the device that is signed by the CA. The signed digital certificate can then be used to authenticate the device 104. Computation and communication costs may make the use of X.509 digital certificates less advantageous.

To solve the foregoing issue, a novel protocol tailored to the IoT devices 104 and systems is described herein. In this protocol, the IoT device 104 is instead be authenticated by communication with an authentication server 102 as further described below. Such communication may be implemented with lighter weight computation and communication requirements. Further, the entity providing the authentication server 102 may allow the manufacturer to integrate their own software code with code designed for the authentication operations, thus increasing security and permitting integrated code to be tested on the IoT devices 104.

This protocol achieves two primary objectives. First, the protocol establishes a mechanism for authenticating all message requests from legitimate IoT devices 104. The mechanism specifies concrete steps to "securely deliver" the necessary credentials to devices 104. Once such credentials are in place, the mechanism is able to detect and reject unauthenticated device messages, thereby preventing unauthorized use of the provisioning service. Second, the protocol establishes a mechanism for binding provisioning services and privileges with a specific customer. This mechanism helps detect manufacturing errors during production. This is accomplished by use of a secret value herein described "Anti-Tampering Secret" or ATS that is unique for each customer. The ATS serves as a security check during the protocol execution, thereby preventing unauthorized use of the provisioning service.

The described protocol also achieves additional objectives. The protocol supports use of a single package for the client source code for all types of IoT devices, independent of whether it has access to hardware security modules or not. The protocol also helps customers integrate client source code with minimal changes. Finally, the protocol reduces computation and communication costs for the device. This may include small request and response buffer sizes and foregoing reliance on X.509 certificate-based message signing.

Device Message Authentication

Authenticating device messages can be accomplished by implementing an authentication algorithm on the device. Such algorithms can be a signature algorithm (e.g., Rivest-Shamir-Adleman or RSA algorithm, Elliptic Curve Digital Signature Algorithm (ECDSA)) or a Message Authentication Code (MAC) algorithm such as a hash-based message authentication code (HMAC).

However, practical implementation of such authentication is made difficult because all such techniques require establishment of a cryptographic key in advance of such authentication. Depending on the algorithm, this cryptographic key may comprise either a signing key or a MAC key. For ease of reference, the term "authentication key" is used in this disclosure to refer to both such keys if the distinction between different algorithms is not necessary.

The entity providing the authentication key may need to deliver the authentication key to each device via the device manufacturer or chip manufacturer (in cases where security operations are at least partially implemented in a secure chip). Depending on the implementation constraints of the IoT device or chip manufacturer and its relationship with the PKI company, either secure channel (e.g., PGP) or white-box cryptography technique may be used to deliver such authentication keys.

Anti-Tampering Secret (ATS)

As described below, an authentication key provisioning service generates, for each customer, a unique secret value, hereafter referred to as an anti-tampering secret (ATS). The ATS encapsulates, in a secret way, information that is specific to the associated customer and the services and/or privileges that have been granted to the customer, which is collectively defined as customer-specific information (CSI). The ATS essentially becomes a shared secret between the provisioning server and the customer. The ATS can be generated in a variety of ways and the characteristics of the ATS depend on the application. However, the ATS must have a number of characteristics. First, when the (IoT or other) device communicates with another entity, the device should be able to prove that the device implicitly or explicitly knows the value of the ATS. Second, the information to be included in the CSI that is used to derive the ATS should be flexible enough to avoid a combinatorial explosion in the number of ATS values in the system. Finally, the CSI and ATS pair should be securely stored or otherwise derivable from information in the server database.

The ATS, CSI pair may be generated in a variety of ways. First, the ATS may be generated from the CSI. For example, the ATS may be an encrypted version of the CSI (e.g. ATS=E[CSI]). In another example, the ATS is a cryptographic hash of the CSI. Second, the ATI may be simply a unique random (or pseudorandom) number that is mapped to the CSI. For example, the authentication server 102 may simply generate multiple random numbers and assign a CSI to one of such random numbers, then associatively store them for later use.

Note that for all the definitions of ATS, CSI pairs, the ATS appears to entities not privy to its generation and/or storage as a pseudorandom number that does not reveal any useful information about the CSI.

Figure 2:
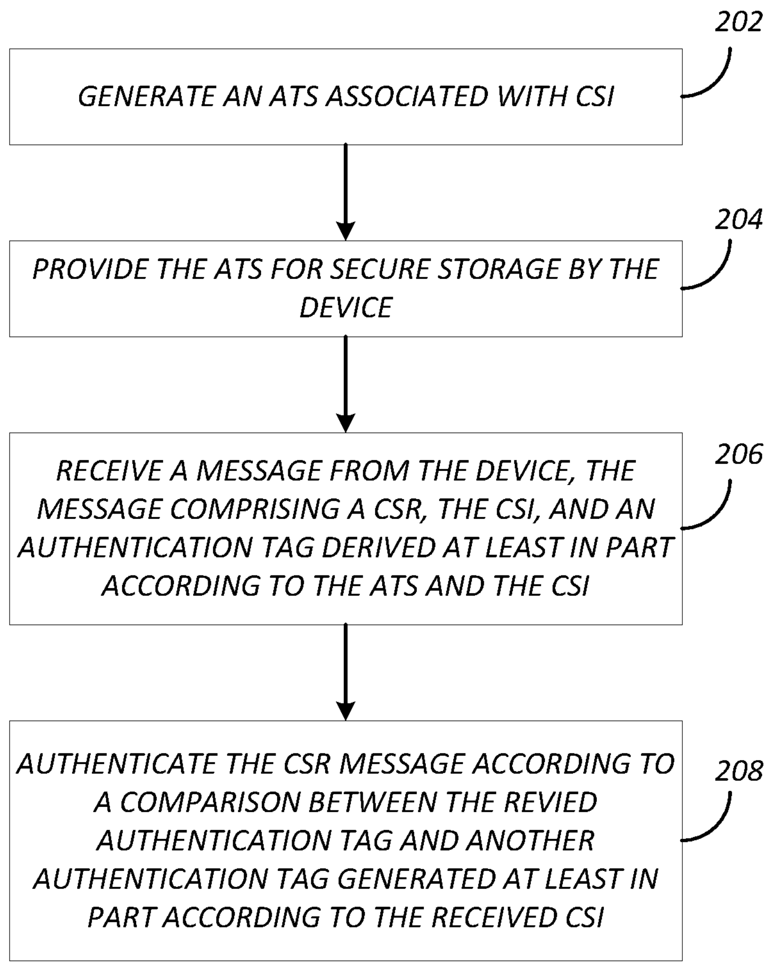
FIG. 2 is a diagram illustrating exemplary operations that can be used to authenticate a remote device.

FIG. 2 is a diagram illustrating exemplary operations that can be used to authenticate a remote device such as an IoT device 104. In block 202, an ATS associated with the CSI is generated, for example, by the authentication server 102. The CSI includes customer-specific information such as PKI type, customer identifier (ID), and product ID. The CSI may also include information describing rights and privileged of the customer, or other information.

In one embodiment, the ATS is a pseudorandom or random number that is independently generated and stored in the authentication server 102 associatively with (or mapped to) the CSI. In another embodiment, the ATS is an encrypted version of the CSI. In a still further embodiment, the ATS is a cryptographic hash of the CSI. For example, the ATS may be defined as a cryptographic hash of two fields: FR=Fixed padding=a random number of sufficient bits, and the CSI.

The pair (CSI, ATS) is then encrypted by an authentication server key and the encrypted version (E[CSI, ATS)] is stored the server for later retrieval and use. In one embodiment, rather than storing the ATS associatively with the CSI, the CSI is stored by the authentication server 102 and when needed, the ATS is recomputed for use in the authentication process. In the case where the FR is used to generate the ATS, the FR should be securely stored as well.

In block 204, the ATS is then provided to the IoT device manufacturer 108 or the chip manufacturer 110 via a secure channel (secure channel 114 and 116, respectively). In one embodiment, the ATS provided the IoT device 104 by the IoT manufacturer 108 for secure storage, being protected, for example, by enforcing a TEE or by storage in a secure chip 118. In other embodiments, the authentication server 102 integrates the ATS in the source code of the IoT device via whitebox cryptography techniques. After the manufacture of the IoT devices 104 is complete, they are delivered to customers for use.

When the customer wishes a service that requires the IoT device 104 to be authenticated, a message having a request (for example, a certificate signing request message having the certificate signing request) is transmitted from the IoT device 104 to the authentication server 102. The message includes the CSR, the CSI, and an authentication tag derived at least in part according to the ATS and the CSI, and may also include a nonce.

In one embodiment, the authentication tag is computed by deriving an authentication key from the ATS, then computing an authentication tag on the CSR. The authentication key may be an HMAC key generated as follows:

$$HK = KDF(\text{nonce} + ATS) \qquad \text{Equation (1)}$$

wherein HK represents the HMAC key, KDF represents a key derivation function, the nonce is an optional random nonce of sufficient size to introduce randomness in the key generation, and the "+" operator represents concatenation. The KDF can be any suitable function for securely deriving a cryptographic key from a seed having sufficient entropy known to both the IoT device 104 and the authentication server 102. For example, a standardized KDF such as is described in NIST Special Publication NIST SP 800-108r1, "Recommendation for Key Derivation Using Pseudorandom Functions", August 2022 (hereby incorporated by reference herein) may be used. The authentication tag can then be computed on the CSR request as:

$$AuthTag = HMAC(HK, CSI + CSR + \text{nonce}) \qquad \text{Equation (2)}$$

where HMAC is a secret-key based message authentication algorithm that defined in RFC 2104, which is incorporated by reference herein.

The IoT device 104 then generates the aforementioned message that includes the CSR, the CSI, and the computed authorization tag, and optional nonce, and sends the message to the authentication server 102. Communication between the authentication server 102 and the IoT devices 104 is preferably performed via the Internet. In some implementations, there may be a manufacturer programming station between the IoT device 104 and the authentication server 102 to facilitate communication, without impacting the authentication protocol described herein.

In block 206, the authentication server 102 receives the CSR message from the device 104. The authentication server 102 then authenticates the CSR message according to a comparison between the received authentication tag and another authentication tag generated at least in part according to CSI received in the CSR request message, as shown in block 208.

Figure 3:
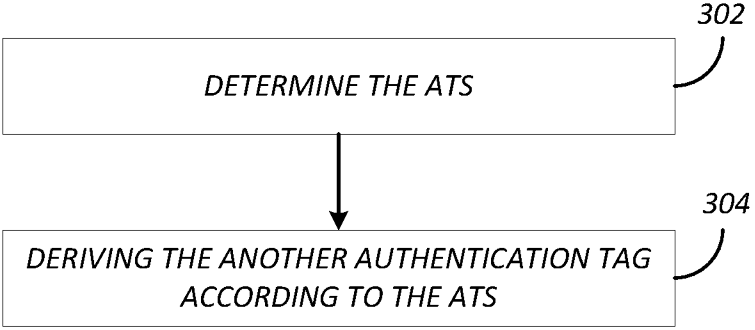
FIG. 3 is a diagram depicting one embodiment of how the authentication server computes the authentication tag.

FIG. 3 is a diagram depicting one embodiment of how the authentication server 102 computes the authentication tag. In block 302, the authentication server determines the ATS from the CSR message. This may be accomplished by extracting the CSI from the CSR message, and retrieving the ATS associated with the CSI from secure storage of the authentication server 102. Alternatively, the CSI in the CSR message may be used to regenerate the ATS, using the same technique used to generate the ATS originally provisioned to the device 104.

Once the ATS has been determined, it is used to generate another authentication tag (hereinafter alternatively referred to as AuthTag'), as shown in block 304.

Figure 4:
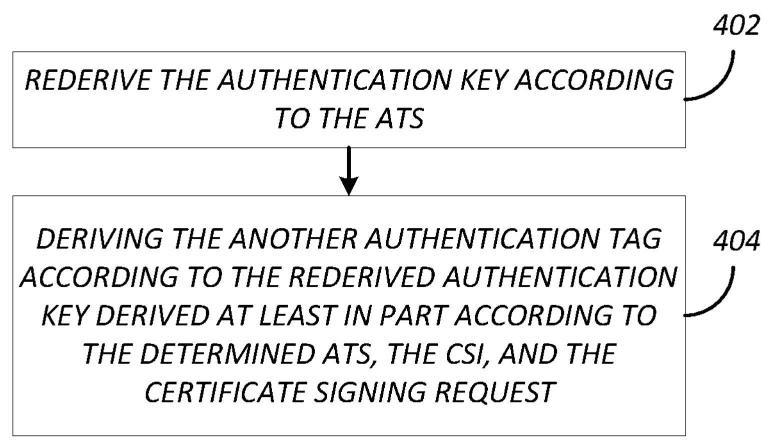
FIG. 4 is a diagram depicting one embodiment of the derivation of AuthTag' from the ATS.

FIG. 4 is a diagram depicting one embodiment of the derivation of AuthTag' from the ATS. The operations performed to accomplish this mirror those performed by the IoT device 104 to compute the authorization tag that was included in the CSR message (hereinafter alternatively referred to as AuthTag). In block 402, the authorization key is rederived according to the ATS. This can be accomplished, for example, by deriving rederiving the authentication key as described in Equation 1, using the ATS determined in block 302, and the optional nonce included with the CSR request message. In block 404 the another authentication tag (AuthTag') is derived according to the rederived authentication key. Again, this is accomplished using operations minoring those performed in the IoT device 104 in generating the authentication tag sent as a part of the CSR message, as described below:

$$AuthTag' = HMAC(HK, CSI + CSR + \text{nonce}) \qquad \text{Equation (3)}$$

If AuthTag=AuthTag', the authentication server 102 authenticates the request transmitted by the IoT device 104, and the authentication server 102 transmits a reply to the IoT device 104. If AuthTag≠AuthTag', the authentication server 102 takes appropriate action, for example, failing to reply to the CSR message, or replying with an error. Further, the authentication server 102 may report and/or log the failed request.

Note that if there is a mistake in the CSI included in the CSR message, the authentication server 102 will not be able to locate the associated ATS in the authentication server database, nor will the authentication server 102 be able to regenerate the ATS from the CSI. In ither case, the corresponding ATS cannot be determined, and authorization will fail. This detects mistakes or errors in the CSI in an implicit way.

In the foregoing description, the IoT device 104 may communicate the CSR message directly with the authentication server 102. As shown in FIG. 1, in other embodiments, the IoT device 104 may communicate the CSR message to a CA 106, and the CA 106 may forward the CSR message to the authentication server 102 for authentication before responding to the request.

Hardware Environment

Figure 5:
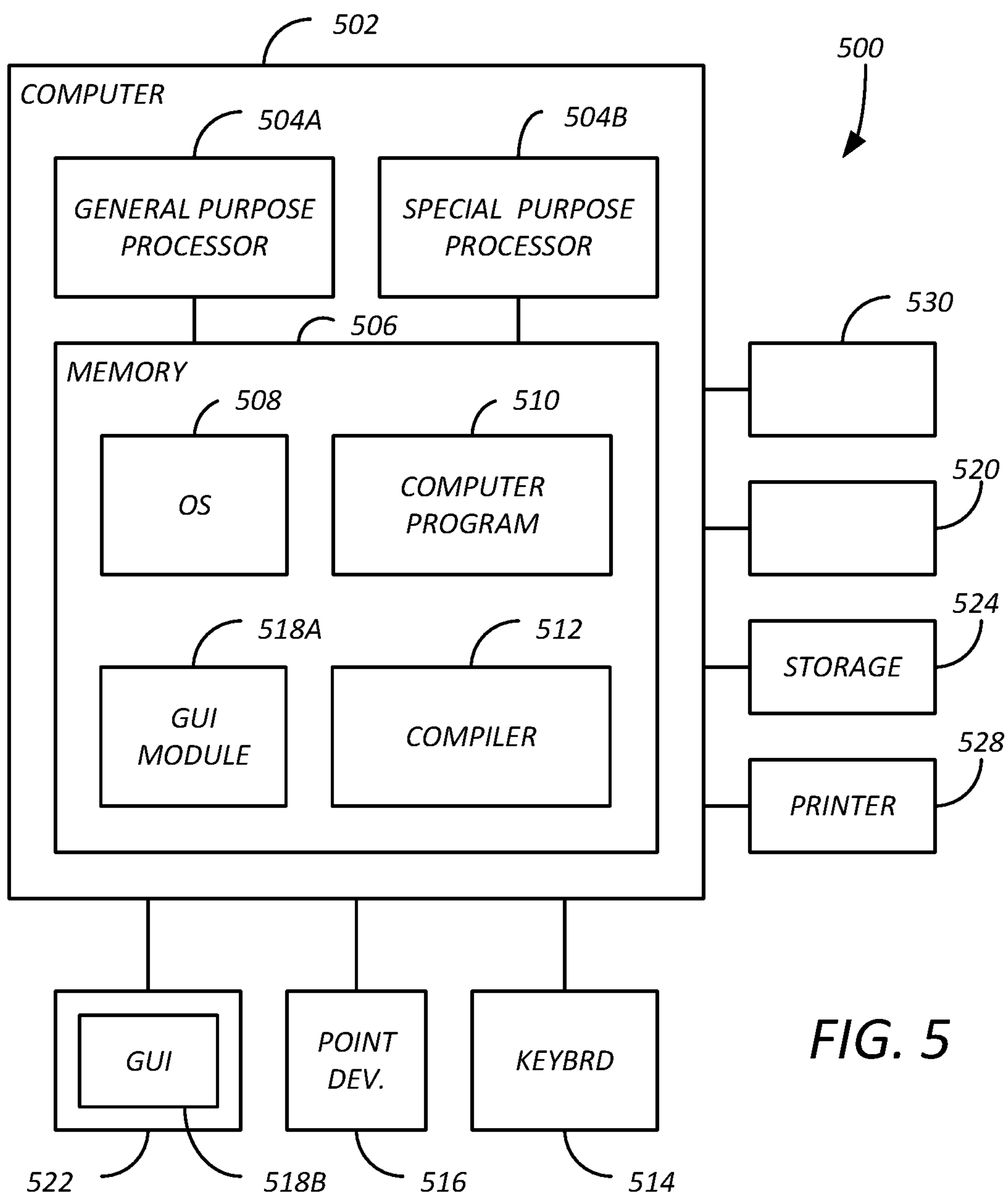
FIG. 5 is a diagram illustrating an exemplary computer system that could be used to implement processing elements of the geolocation system.

FIG. 5 illustrates an exemplary computer system 500 that could be used to implement processing elements of the above disclosure, including the authentication server 102, the IoT device 104, and the certificate authority 106. The computer 502 comprises a processor 504 and a memory, such as random access memory (RAM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of authenticating a device. The method also includes generating an anti-tampering secret (ATS) associated with customer specific information (CSI); providing the ATS for secure storage by the device; receiving a message from the device, the message may include: a certificate signing request (CSR); the CSI; an authentication tag derived at least in part according to the CSR, the ATS, and the CSI. The method also includes authenticating the received message according to a comparison of the received authentication tag and a another authentication tag generated at least in part according to the received CSI. Other embodiments of this aspect include corresponding computer systems, apparatus, and computer programs recorded on one or more computer storage devices, each configured to perform the actions of the methods.

Implementations may include one or more of the following features.

The method above, wherein the ATS is computed at least in part from a random number and the CSI.

Any of the methods above, wherein: the authentication tag is computed at least in part according to an authentication key, the CSI and the certificate signing request; and the authentication key computed at least in part according to the ATS.

Any of the methods above, wherein: the authentication tag is computed at least in part as a cryptographic function according to: the authentication key; the CSI; and the certificate signing request. Any of the methods above, wherein: authenticating the certificate signing request according to the comparison of the received authentication tag and another authentication tag generated at least in part according to the received CSI may include: determining the ATS; and deriving the another authentication tag according to the ATS.

Any of the methods above, wherein: determining the ATS may include one of: retrieving the generated ATS associated with the received CSI; and regenerating the ATS at least in part according to the received CSI.

Any of the methods above, wherein: deriving the another authentication tag according to the ATS may include: rederiving the authentication key according to the ATS; and deriving the another authentication tag at least in part as a cryptographic function according to: the rederived authentication key; the CSI; and the certificate signing request.

Any of the methods above, wherein: the authentication key is derived according to the ATS, a generated random nonce, and a key derivation function; the authentication tag is computed at least in part as a cryptographic function according to: the authentication key; the CSI; the certificate signing request; the generated random nonce; and the message further may include the generated random nonce; the rederived authentication key is further derived according to the received generated random nonce; and the another authentication tag is further derived according to the received nonce. Implementations of the described techniques may include hardware, a method or process, or computer software on a computer-accessible medium.

One general aspect includes an apparatus of authenticating a device. The apparatus also includes a processor; a memory, communicatively coupled to the processor, the memory storing processor instructions that include processor instructions for: generating an ATS associated with CSI; providing the ATS for secure storage by the device; receiving a message from the device, the message may include: a CSR; the CSI; an authentication tag derived at least in part according to the CSR, the ATS and the CSI. The apparatus also includes authenticating the received message according to a comparison of the received authentication tag and a another authentication tag generated at least in part according to the received CSI. Other embodiments of this aspect include corresponding computer systems, apparatus, and computer programs recorded on one or more computer storage devices, each configured to perform the actions of the methods.

Implementations may include one or more of the following features.

The apparatus above, wherein the ATS is computed at least in part from a random number and the CSI.

Any apparatus above, wherein: the authentication tag is computed at least in part according to an authentication key, the CSI and the certificate signing request; and the authentication key computed at least in part according to the ATS.

Any apparatus above, wherein: the authentication tag is computed at least in part as a cryptographic function according to: the authentication key; the CSI; and the certificate signing request.

Any apparatus above, wherein: the processor instructions for authenticating the certificate signing request according to the comparison of the received authentication tag and another authentication tag generated at least in part according to the received CSI may include processor instructions for: determining the ATS; and deriving the another authentication tag according to the ATS.

Any apparatus above, wherein: the processor instructions for determining the ATS may include processor instructions for one of: retrieving the generated ATS associated with the received CSI; and regenerating the ATS at least in part according to the received CSI.

Any apparatus above, wherein: the processor instructions for deriving the another authentication tag according to the ATS may include processor instructions for: rederiving the authentication key according to the ATS; and deriving the another authentication tag at least in part as a cryptographic function according to: the rederived authentication key; the CSI; and the certificate signing request.

Any apparatus above, wherein: the authentication key is derived according to the ATS, a generated random nonce, and a key derivation function; the authentication tag is computed at least in part as a cryptographic function according to: the authentication key; the CSI; the certificate signing request; the generated random nonce; and the message further may include the generated random nonce; the rederived authentication key is further derived according to the received generated random nonce; and the another authentication tag is further derived according to the received nonce. Implementations of the described techniques may include hardware, a method or process, or computer software on a computer-accessible medium.

The foregoing description of the preferred embodiment has been presented for the purposes of illustration and description. It is not intended to be exhaustive or to limit the disclosure to the precise form disclosed. Many modifications and variations are possible in light of the above teaching. For example, the foregoing principles can be used to design an ATS-based authentication protocol with different authentication algorithms, or authentication keys generated using different algorithms and data, or delivered to the IoT manufacturer 108 and/or the IoT device 104. The ATS may also be defined differently than described herein, and may be stored by the authentication server 102 or delivered to the IoT device manufacturer 108 or the IoT device 104 in different ways. Finally, different message exchanges may be defined.

It is intended that the scope of rights be limited not by this detailed description, but rather by the claims appended hereto.

What is claimed is:

1. A method of authenticating a device, comprising:
generating an anti-tampering secret (ATS) associated with customer specific information (CSI);
providing the ATS for secure storage by the device;
receiving a message from the device, the message comprising:
a certificate signing request (CSR);
the CSI;
an authentication tag derived at least in part according to the CSR, the ATS, and the CSI; and
authenticating the received message according to a comparison of the received authentication tag and another authentication tag generated at least in part according to the received CSI, by determining the ATS, wherein determining the ATS comprises at least one of:
retrieving the generated ATS associated with the received CSI; and
regenerating the ATS at least in part according to the received CSI.

2. The method of claim 1, wherein the ATS is computed at least in part from a random number and the CSI.

3. The method of claim 2, wherein:
the authentication tag is computed at least in part according to an authentication key, the CSI and the certificate signing request; and
the authentication key computed at least in part according to the ATS.

4. The method of claim 3, wherein:
the authentication tag is computed at least in part as a cryptographic function according to:
the authentication key;
the CSI; and
the certificate signing request.

5. The method of claim 4, wherein:
authenticating the certificate signing request according to the comparison of the received authentication tag and another authentication tag generated at least in part according to the received CSI comprises:
deriving the another authentication tag according to the ATS.

6. The method of claim 5, wherein deriving the another authentication tag according to the ATS comprises:
rederiving the authentication key according to the ATS; and
deriving the another authentication tag at least in part as a cryptographic function according to:
the rederived authentication key;
the CSI; and
the certificate signing request.

7. The method of claim 6, wherein:
the authentication key is derived according to the ATS, a generated random nonce, and a key derivation function;
the authentication tag is computed at least in part as a cryptographic function according to:

the authentication key;
the CSI;
the certificate signing request;
the generated random nonce; and
the message further comprises the generated random nonce;
the rederived authentication key is further derived according to the received generated random nonce; and
the another authentication tag is further derived according to the received nonce.

8. An apparatus of authenticating a device, comprising:
a processor;
a memory, communicatively coupled to the processor, the memory storing processor instructions comprising processor instructions for:
generating an anti-tampering secret (ATS) associated with customer specific information (CSI);
providing the ATS for secure storage by the device;
receiving a message from the device, the message comprising:
a certificate signing request (CSR);
the CSI;
an authentication tag derived at least in part according to the CSR, the ATS and the CSI; and
authenticating the received message according to a comparison of the received authentication tag and a another authentication tag generated at least in part according to the received CSI, by determining the ATS, wherein determining the ATS comprises at least one of:
retrieving the generated ATS associated with the received CSI; and
regenerating the ATS at least in part according to the received CSI.

9. The apparatus of claim 8, wherein the ATS is computed at least in part from a random number and the CSI.

10. The apparatus of claim 9, wherein:
the authentication tag is computed at least in part according to an authentication key, the CSI and the certificate signing request; and
the authentication key computed at least in part according to the ATS.

11. The apparatus of claim 10, wherein:
the authentication tag is computed at least in part as a cryptographic function according to:
the authentication key;
the CSI; and
the certificate signing request.

12. The apparatus of claim 11, wherein:
the processor instructions for authenticating the certificate signing request according to the comparison of the received authentication tag and another authentication tag generated at least in part according to the received CSI comprise processor instructions for:
deriving the another authentication tag according to the ATS.

13. The apparatus of claim 12, wherein the processor instructions for deriving the another authentication tag according to the ATS comprise processor instructions for:
rederiving the authentication key according to the ATS; and
deriving the another authentication tag at least in part as a cryptographic function according to:
the rederived authentication key;
the CSI; and
the certificate signing request.

14. The apparatus of claim 13, wherein:
the authentication key is derived according to the ATS, a generated random nonce, and a key derivation function;
the authentication tag is computed at least in part as a cryptographic function according to:
the authentication key;
the CSI;
the certificate signing request;
the generated random nonce; and
the certificate signing request further comprises the generated random nonce;
the rederived authentication key is further derived according to the received generated random nonce; and
the another authentication tag is further derived according to the received nonce.

* * * * *